Nov. 17, 1964 L. E. PALMER 3,157,265

PRINT INTERLOCK FOR TYPEWRITER

Filed March 29, 1962 2 Sheets-Sheet 1

INVENTOR.
LEON E. PALMER

BY Ralph C. Austin

ATTORNEY.

Nov. 17, 1964 L. E. PALMER 3,157,265

PRINT INTERLOCK FOR TYPEWRITER

Filed March 29, 1962 2 Sheets-Sheet 2

United States Patent Office 3,157,265
Patented Nov. 17, 1964

3,157,265
PRINT INTERLOCK FOR TYPEWRITER

Leon E. Palmer, Lexington, Ky., assignor to International Business Machines Corporation, New York, N.Y., a corporation of New York
Filed Mar. 29, 1962, Ser. No. 183,468
3 Claims. (Cl. 197—16)

This invention relates to typewriters, and more particularly to a mechanism which operates when a typewriter case shift is taking place for delaying a print operation until the shift has been completed.

There is shown in U.S. Patent 2,919,002, issued December 29, 1959, to L. E. Palmer, a typewriter having a single element print head with characters formed on its surface. The portion of the surface lying on one side of a vertical bisecting plane carries lower case characters while the portion on the opposite side carries upper case characters. The head is rotated, on actuation of a type key, from a home position in either the lower case portion or the upper case portion to select a character for printing. Another key actuated mechanism is operable for rotating the head to effect a case shift by presenting either the lower case portion or the upper case portion for the selection of characters. The rotating means includes a single tape which is common to both the character selection mechanism and the case shift mechanism. If typing and case shift operations were to take place at the same time, the tape could be broken and, in either case, the character typed would be incorrect.

To prevent simultaneous operations of the character selection and case shift mechanisms, there is provided means which is actuated by the character selection mechanism at the beginning of a print cycle for disabling the case shift mechanism. If a type key and the case shift key are operated simultaneously, the case shift mechanism is disabled even though it may have started operating. The character typed may be incorrect but, in any case, the drive tape is not broken. An actuation of the case shift key while a print cycle is taking place will not affect the selection of a character since the shift mechanism is disabled at the beginning of the selection cycle.

Another means is provided for disabling the character selection mechanism while a case shift cycle is taking place. If a type key is actuated after the shift key and before the shift cycle is completed, operation of the character selection mechanism is delayed until the shift cycle is completed. As soon as the shift cycle is completed, the selection mechanism is released to complete its function.

This application covers the means for delaying the operation of the character selection mechanism. The means for disabling the case shift mechanism is covered in U.S. Patent 3,077,971 to L. E. Palmer.

An object of this invention is to provide an improved mechanism which operates during the shifting of the case by a typewriter to delay any operation for causing a selection and printing of a character until the shift operation has been completed.

Another object is to provide in a typewriter having a common element which is operable to effect either character selection or case shift, an improved means for delaying operation of said element by a character selecting mechanism when it is being operated by a case shift mechanism.

The foregoing and other objects, features and advantages of the invention will be apparent from the following more particular description of the preferred embodiments of the invention, as illustrated in the accompanying drawings.

Figure 1:
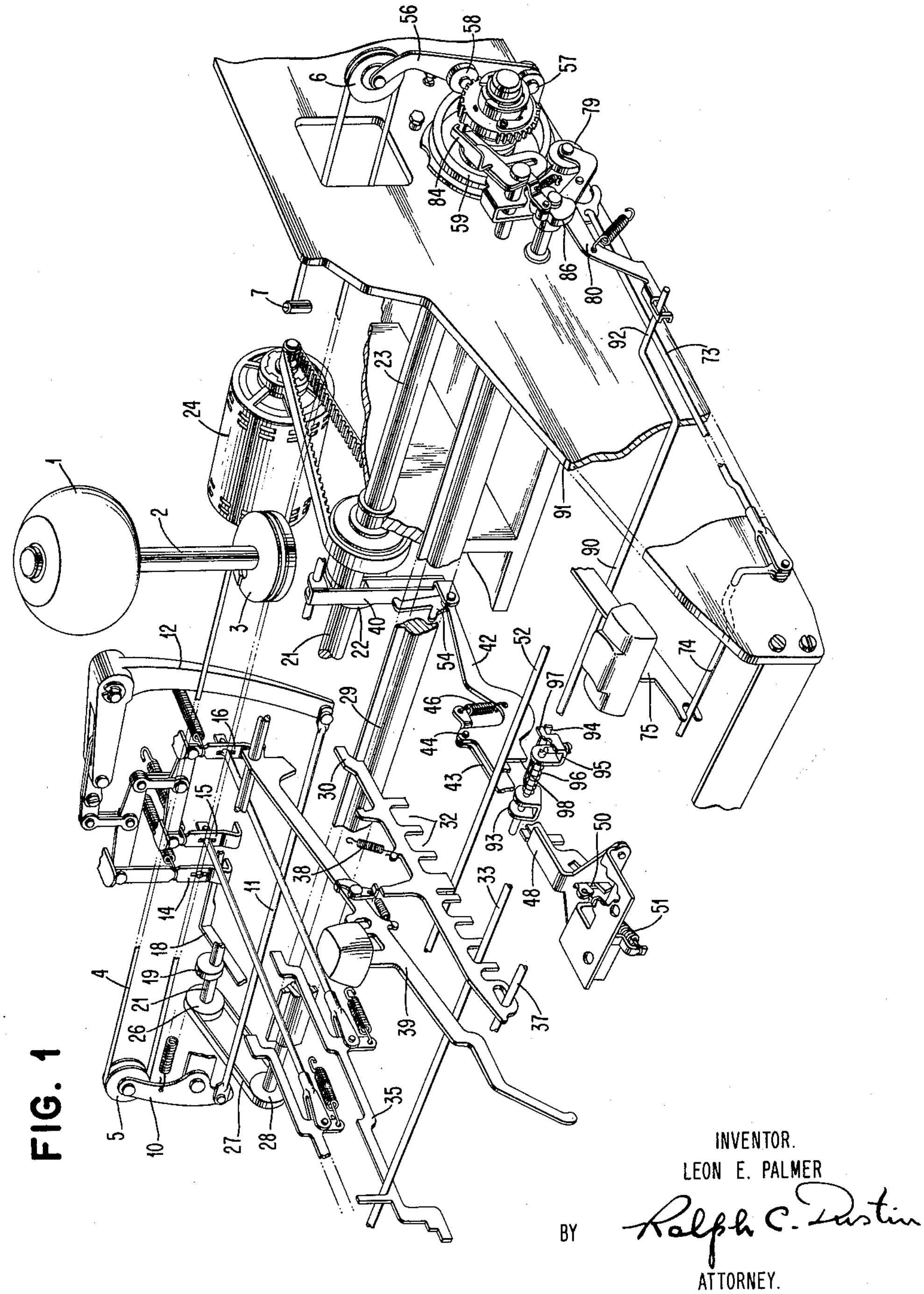
FIG. 1 is a perspective view of a typewriter in which the invention is incorporated.

Referring to FIG. 1, it will be noted that there is shown a typewriter which is generally like that disclosed in the Palmer patent first mentioned above. This typewriter includes a single element print head 1 having lower case characters formed on one half its surface and upper case characters formed on the opposite half. The head is carried by a spindle 2 on which a pulley 3 is mounted at its lower end. A tape 4 is connected at one end to the pulley 3 and then extends around that pulley and over pulleys 5 and 6 to an anchor 7. A spring (not shown) acts on the pulley 3 for rotating it in a direction to maintain a tension on the tape. Pulley 5 is carried by a lever 10 which is connected at its lower end through a link 11 to a bellcrank 12. Operatively connected to the bellcrank are selecting latches 14, 15 and 16 which are normally in positions to be acted upon by a bail 18 operated by a cam 19 on a shaft 21. This shaft is connected through a one-revolution clutch 22 to a continuously rotating shaft 23 driven by a motor 24. Mounted on the shaft 21 is a pulley 26 connected through a belt 27 to a pulley 28 on a filter shaft 29. The drive ratio of the pulleys 26, 28 is such that the filter shaft is driven 180° when the shaft 21 makes one revolution. Formed on the filter shaft are diametrically opposite flanges which act on the ends of interposers 30 if the latter lie in the path of the flanges during rotation of the shaft. One interposer is provided for each type key of the typewriter. Formed in the interposer are notches 32 through which bails 33 extend. Only one bail 33 is shown herein but there are actually six bails, one for each notch 32. The notches are so formed as to cause an operation of a predetermined combination of bails when the interposer is moved longitudinally by the filter shaft. The combination for each interposer is different depending on the character to be typed. Each of three of the bails operatively engages a link 35 which is connected to one of the selecting latches 14, 15, and 16. When one of the bails 33 is actuated, it moves its associated selecting latch from under the bail 18. Those selecting latches remaining under the bail 18 are then actuated by the latter to effect rotation of the print head 1 from one to five units distance depending on the combination of latches actuated.

Figure 2:
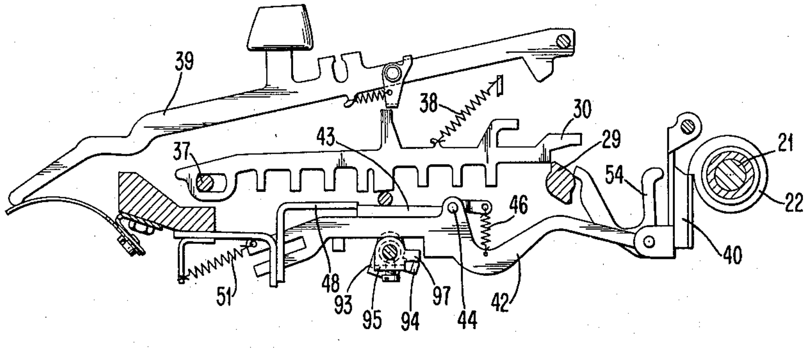
FIG. 2 is a sectional view through the keyboard of the typewriter and shows mechanism actuated by each of the type keys.

Each interposer 30 is supported at its forward end for pivotal and longitudinal movement on a shaft 37 and is normally held in a raised rearward position by a spring 38. Arranged above each interposer is a key lever 39 which operates when depressed to rock the interposer downwardly into the path of one of the flanges on the filter shaft. When any key lever is depressed, it is necessary that the clutch 22 be engaged to drive the shaft 21 one revolution to cause the latches 14, 15 and 16 to be selected and driven for rotating the print head. Clutch 22 is of the helical spring type and is held disengaged when a latch lever 40 is in a position to engage a shoulder on one of the clutch elements. Connected to the lower end of the latch lever is a member 42 on which an arm 43 is pivotally mounted at 44. The forward end of the arm 43 is normally held in a raised position by a spring 46 to engage an abutment member 48. The left end of the member 42 is guided in a slot 50 and is connected to a spring 51 which urges it in a forward direction. Extending transversely of the keyboard between the lower edges of the interposers 30 and the upper edge of the arm 43 is a bail 52 which is rocked downwardly on the depression of an interposer to cause the arm 43 to be disengaged from the abutment 48. When the arm is free from the abutment, the member 42 is moved to the left in FIG. 2 for diengaging the latch lever 40 from the clutch 22. Shaft 21 is then driven and causes the filter shaft 29 to rotate counterclockwise. After a slight rotation of this shaft, a clutch control member 54 is actuated by one of the filter shaft flanges to return the lever 40 to a position in which it operates after one revolution of shaft 21 to disengage the clutch 22. The arm 43 re-engages the abutment 48 to hold the member 42 in its returned position.

Figure 3:
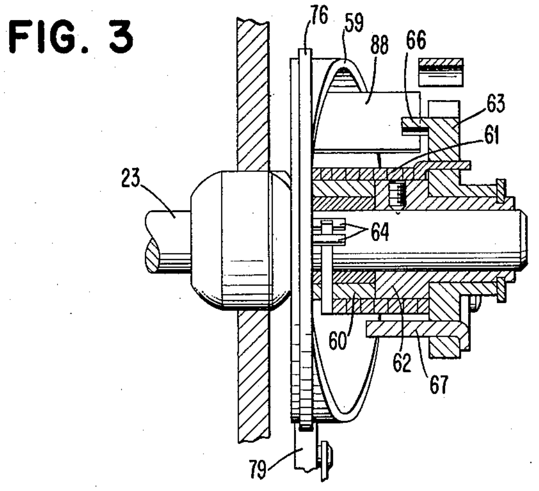
FIG. 3 is an enlarged sectional view taken on the plane of the line 3—3 of FIG. 4 and shows the clutch mechanism which is operable to effect case shift by the typewriter.
Figure 4:
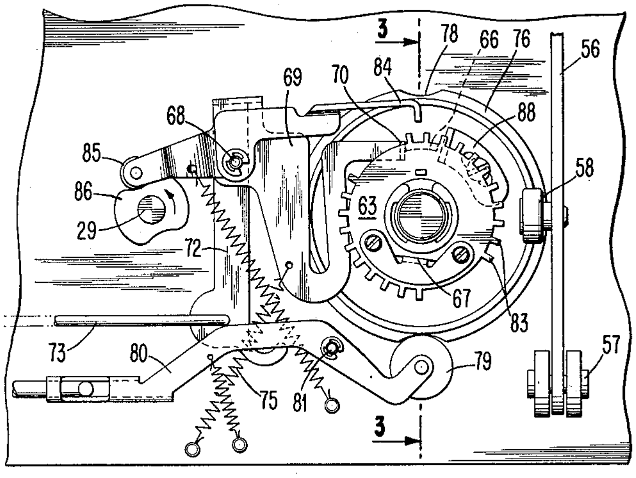
FIG. 4 is an enlarged front elevational view of the case shift mechanism.

Pulley 6 is mounted on a lever 56 pivotally supported at 57 and carries a roller 58 which engages a face cam 59. This cam is normally held to present either a high point or a low point on its surface to the roller 58. The lever 56 is urged by the tension on the tape 4 to maintain contact between the roller 58 and the face cam. When the cam is in a position with its low point opposite the roller the print head 1 is positioned to permit the selection of lower case characters. As the cam is rotated to bring its high point under the roller, the print head is rotated 180° to present upper case characters for selection. Cam 59 is freely mounted on the continuously rotating shaft 23 and has a hub 60 (FIG. 3) about which a helical clutch spring 61 is wrapped. In alignment with the hub is a sleeve 62 fixed to the shaft 23 and having a portion lying within the clutch spring. Freely mounted on the sleeve is a disc 63 to which one end of the clutch spring is connected. The other end of the spring is held between two fingers 64 fixed to the cam 59. Projecting inwardly from the disc are two lugs 66 and 67 spaced different distances radially of the shaft 23. Mounted on a pivot pin 68 (FIG. 4) is a member 69 having a flange portion 70 which lies in the same vertical plane as the lugs 66, 67. Fixed to the member 69 is an arm 72 connected by a link 37 to a bail 74 (FIG. 1) which may be rocked by a case shift key lever 75. The member 69 is normally held by a spring 75 in a position to locate its flange 70 in the path of the lug 67. With this lug engaging the flange, the spring 61 is held expanded and the cam 59 is in a position with the low point on its surface under the roller 58. Formed in a flange 76 at the base of the cam 59 are diametrically opposite notches 78 adapted to receive a detenting roller 79 carried by a lever 80 mounted on a pivot pin 81. While the face cam is held by the detenting roller 79 in a position with the low point on its surface under the roller 58, the print head 1 is positioned for the selection of lower case characters. When the key lever 75 is depressed to the position shown in FIG. 1, the link 73 is moved rearwardly to rock the member 69 to a position in which the flange portion 70 lies in the path of the lug 66. As soon as the lug 67 is disengaged, the disc 63 rotates counterclockwise, if nothing else prevents it, under the action of the clutch spring 61. This results in an engagement of the clutch spring with the sleeve portion 62 and the cam hub 60 to effect a driving of the cam 59. As soon as the lug 66 engages the flange portion 70, one end of the clutch spring is held stationary while its other end turns with the cam which rotates under inertia until the detenting roller drops into the next notch 78. During this operation, the high point on the cam is moved under the roller 58 causing the print head to turn 180° for locating upper case characters in positions for selection.

When a key lever 39 has been actuated to effect a selection and printing of a character, it is necessary that the case shift mechanism be disabled until the printing has been completed. If a case shift operation were to take place during a machine cycle started by actuation of a type key 39, the tape 4 could be broken when the levers 10 and 56 were both swinging outwardly. A swinging of these levers inwardly at the same time may produce a slack in the tape and cause it to jump off the pulleys. In either case, the print head would be positioned incorrectly. A locking or disabling of the case shift mechanism is effected by providing on the outer edge of the disc 63 a plurality of ratchet teeth 83 which may be engaged by a pawl 84 for holding the disc against rotation. The pawl 84 is pivotally mounted on the pin 68 and carries a roller 85 engaging a cam 86 on the filter shaft 29. The cam 86 is shaped to rock the pawl 84 into engagement with the teeth 83 as soon as the filter shaft starts rotating. If the key levers 39 and 75 are depressed simultaneously, the disc 63 may rotate slightly before the pawl 84 is moved into engagement with the ratchet teeth and stops rotation of the disc. If the clutch spring 61 has already operated to start driving the cam 59, then the rotation of the cam with the disc 63 stopped causes the clutch spring to b expanded for breaking the drive connection. In order to limit rotation of the cam 59 by inertia after the clutch spring has been disengaged, there is provided an abutment member 88 projecting from the cam into the path of the lug 66. This member is arranged so a slight clearance exists between it and the lug 66 when the clutch spring is held in its normal released position. When the disc is stopped by the pawl 84, the cam can continue rotating only until the abutment engages the lug 66, the clutch spring then being expanded only slightly beyond normal.

If one of the type keys 39 is depressed after the case shift key 75 is actuated and before the case shift operation has been completed, a mechanism operates to delay actuation of the clutch 22 for selecting and printing a character until after completion of the case shift. The mechanism comprises a rod 90 (FIG. 1) rotatably supported by the sides of the typewriter frame 91 and having at one end a crank arm 92 which is connected to the lever 80 carrying the detenting roller 79. Mounted on the rod 90 adjacent the clutch control member 42 is a U-shaped element 93 carrying a finger 94 which extends parallel to the rod in the path of the member 42. Fixed to the rod 90 at a point near the end of the finger 94 is another U-shaped element 95 to which one end of a helical spring 96 is connected. The other end of the spring 96 acts on the lower side of the finger 94 and tends to swing the latter upwardly. Element 93 is freely mounted on the rod so the finger 94 can be swung upwardly if nothing is holding it. Extending from the element 95 is a projection 97 which acts on the top side of the finger 94 for holding it against the action of the spring 96.

When the print head 1 is in either lower case or upper case position, the detenting roller 79 is in one of the notches 78 and the rod 90 is held in a position to locate the finger 94 slightly below the member 42. As soon as the cam 59 starts rotating to shift the case position of the print head, the roller 79 is forced out of the notch 78 and causes the rod 90 to turn in a counterclockwise direction. The member 95 turns with the rod and permits the finger 94 to swing upwardly under the action of the spring 96. If the member 42 has not moved forwardly due to an actuation of a type key, the finger 94 moves into the path of a shoulder 98 on the member 42 and limits forward movement of the latter. There is permitted sufficient forward movement to prevent re-engagement of the arm 43 with the abutment 48 while the finger 94 is engaged by the shoulder 98 and yet the movement is insufficient to engage the clutch 22. As soon as the shift cycle is completed and the finger 94 is rocked downward due to engagement of the detenting roller 79 with a notch 78, the member 42 moves forward under the action of the spring 51 and causes a selection and print cycle to take place.

While there has been described one form which the invention may assume in practice, it will be understood that it may be modified and embodied in various other forms without departing from the spirit and scope of the appended claims.

What is claimed is:

1. In a typewriter having a print head with lower case and upper case characters formed on different portions of its surface,
first key controlled means operable to effect case shift by moving said head to present either of said surface portions for the selection of characters,
second key controlled means for moving said head within the area of either of said portions presented to effect the selection of characters to be printed,
said second key controlled means including a clutch which is operable when engaged for positioning said head,
a control member movable between a first position holding said clutch disengaged and a second position permitting its engagements,
a latch for holding said control member in said first position,
means yieldingly urging said control member to said second position,
means operating with said second key controlled means for releasing said latch,
an element movable into the path of said control member for blocking its movement toward said second position,
and means acting at the beginning of an operation by said first key controlled means for effecting movement of said element into the path of said control member.

2. The typewriter of claim 1 in which said element is yieldingly urged toward the path of said control member,
a device for holding said element free of said control member,
and means effective at the beginning of an operation by said first key controlled means for releasing said device from said element.

3. In a typewriter having a print head with lower case and upper case characters formed on different portions of its surface:
first key controlled means for moving said head to present either of said surface portions for the selection of characters,
second key controlled means for moving said head within the area of either of said portions presented to effect the selection of characters to be printed,
said second key controlled means including:
a clutch which is operable when engaged for positioning said head,
an operating member acting on said clutch for holding it disengaged,
means yieldingly acting on said member for urging it to a position releasing said clutch,
a latch normally holding said member against the action of said yielding means,
a key lever operating when depressed to release said latch;
and an element moving, on operation of said first key controlled means, into the path of said member for blocking it against movement by said yielding means.

References Cited in the file of this patent

UNITED STATES PATENTS 2,847,105 Carroll ---------------- Aug. 12, 1958

Dedication 3,157,265.—*Leon E. Palmer*, Lexington, Ky. PRINT INTERLOCK FOR TYPEWRITER. Patent dated Nov. 17, 1964. Dedication filed Dec. 5, 1979, by the assignee, *International Business Machines Corporation.*

Hereby dedicates to the Public the remaining term of said patent.

[*Official Gazette, March 18, 1980.*]